(12) United States Patent
Balasubramanian (10) Patent No.: US 11,778,449 B2
(45) Date of Patent: Oct. 3, 2023

(54) LOCAL TRAFFIC OFFLOAD FUNCTION WITH OVERLOADED S5 AND SGI INTERFACE

(71) Applicant: Celona, Inc., Cupertino, CA (US)

(72) Inventor: Srinivasan Balasubramanian, San Diego, CA (US)

(73) Assignee: Celona, Inc., Campbell, CA (US)

( * ) Notice: Subject to any disclaimer, the term of this patent is extended or adjusted under 35 U.S.C. 154(b) by 45 days.

(21) Appl. No.: 17/668,148

(22) Filed: Feb. 9, 2022

(65) Prior Publication Data

US 2022/0272519 A1    Aug. 25, 2022

Related U.S. Application Data

(62) Division of application No. 16/929,029, filed on Jul. 14, 2020, now Pat. No. 11,363,444.

(51) Int. Cl.
| | |
|---|---|
| H04W 8/08 | (2009.01) |
| H04W 60/00 | (2009.01) |
| H04W 8/26 | (2009.01) |
| H04W 76/27 | (2018.01) |
| H04W 68/12 | (2009.01) |
| H04W 92/02 | (2009.01) |
| H04W 84/10 | (2009.01) |
| H04W 88/06 | (2009.01) |
| H04W 88/16 | (2009.01) |

(52) U.S. Cl.
CPC ............. *H04W 8/082* (2013.01); *H04W 8/26* (2013.01); *H04W 60/00* (2013.01); *H04W 68/12* (2013.01); *H04W 76/27* (2018.02); *H04W 84/105* (2013.01); *H04W 88/06* (2013.01); *H04W 88/16* (2013.01); *H04W 92/02* (2013.01)

(58) Field of Classification Search
CPC ....... H04W 8/082; H04W 76/27; H04W 8/26; H04W 60/00; H04W 68/12; H04W 84/105; H04W 88/06; H04W 88/16; H04W 92/02
USPC .... 455/435.1, 418, 432.1, 422.1, 410, 414.1
See application file for complete search history.

(56) References Cited

U.S. PATENT DOCUMENTS

| | | | | |
|---|---|---|---|---|
| 7,079,499 B1* | 7/2006 | Akhtar | ................... | H04L 67/306 370/310 |
| 2017/0251013 A1* | 8/2017 | Kirti | ........................ | H04L 63/20 |
| 2018/0295509 A1* | 10/2018 | Lee | .......................... | H04W 8/20 |
| 2018/0337851 A1* | 11/2018 | Smithson | ................ | H04L 45/52 |

* cited by examiner

*Primary Examiner* — Nghi H Ly
(74) *Attorney, Agent, or Firm* — JAQUEZ LAND GREENHAUS & McFARLAND LLP; Bruce W. Greenhaus, Esq.

(57) ABSTRACT

A system and method is disclosed for allowing a Third-Party (TP) User Equipment (UE) to use a base station/access point (BS/AP), such as a 4G eNodeB (eNB) or a 5G gNodeB (gNB) of a private network, such as an enterprise network to access components of a network core, such as an Evolved Packet Core (EPC) in the TP network while also having access to features provided by or through components of an EPC within the private network.

6 Claims, 10 Drawing Sheets

LOCAL TRAFFIC OFFLOAD FUNCTION WITH OVERLOADED S5 AND SGI INTERFACE

CROSS-REFERENCE TO RELATED APPLICATIONS—CLAIM OF PRIORITY

This application is a divisional of, and claims the benefit of priority under 35 USC § 120 of, commonly assigned and co-pending prior U.S. application Ser. No. 16/929,029, filed Jul. 14, 2020, entitled "Local Traffic Offload Function with Overloaded S5 and SGI Interface", the disclosure of which is incorporated herein by reference in its entirety.

BACKGROUND

(1) Technical Field

The disclosed method and apparatus generally relate to establishing a communication link to a communications network. In particular, the disclosed method and apparatus relates to assisting a local enterprise network in communicating with mobile user equipment registered with a third party network.

(2) Background

Figure 1:
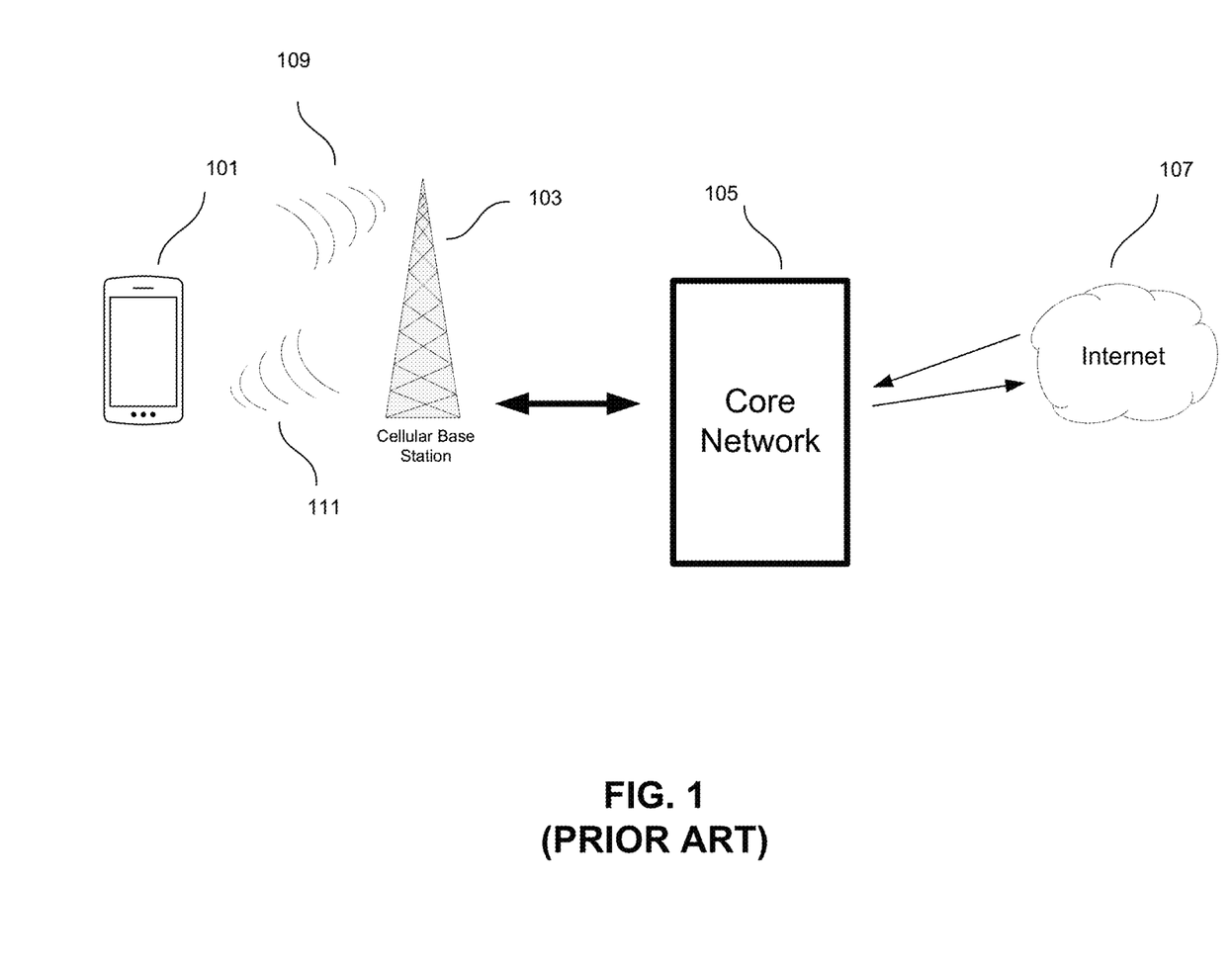
FIG. 1 is an illustration of a basic configuration for a communication network, such as a "4G LTE" (fourth generation Long-Term Evolution) or "5G NR" (fifth generation New Radio) network, in which user equipment (UE) communicates with a base station/access point (BS/AP).

FIG. 1 is an illustration of a basic configuration for a communication network, such as a "4G LTE" (fourth generation Long-Term Evolution) or "5G NR" (fifth generation New Radio) network, in which user equipment (UE) communicates with a base station/access point (BS/AP). The term UE refers to a wide array of devices having wireless connectivity, such as a cellular mobile phone, Internet of Things (IoT) device, virtual reality googles, robotic device, autonomous driving machine, smart barcode scanner, and communications equipment. Communications equipment includes desktop computers, laptop computers, tablets and other types of personal communications devices. Throughout this disclosure, the term BS/AP is used broadly to include at least an eNB (Evolved Node B or E-UTRAN Node B) of a 4G network or gNB (5G node B) of an LTE/5G network, a cellular base station (BS), a Citizens Broadband Radio Service Device (CBSD), a WiFi access node, a Local Area Network (LAN) access point, a Wide Area Network (WAN) access point, etc. and should also be understood to include other network receiving hubs that provide wireless access by a plurality of wireless transceivers to a network.

In some cases, a UE 101 uses a BS/AP 103 to gain access to a network of other devices and services. 5G technology supports both public networks, such as cellular networks, and private networks, such as enterprise networks. The BS/AP 103 is coupled to a core network 105 that manages traffic through the BS/AP 103 and connectivity to resources, such as the internet 107.

Figure 2:
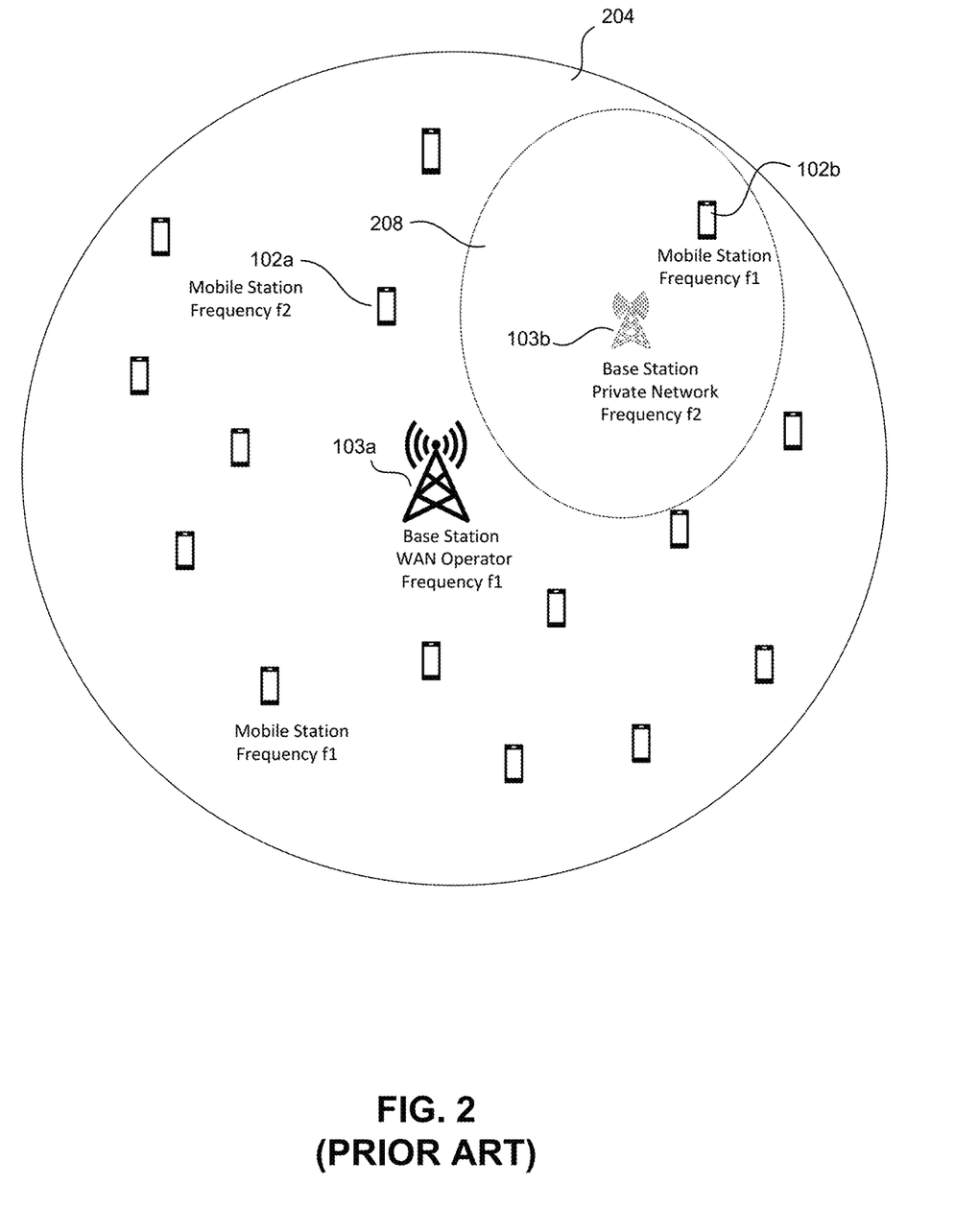
FIG. 2 is an illustration of a larger network, such as a 5G cellular network operated by a Mobile Network Operator (MNO), sometimes referred to as a wireless service provider.

FIG. 2 is an illustration of a larger network 204, such as a 5G cellular network operated by a Mobile Network Operator (MNO), sometimes referred to as a wireless service provider. Within the geographic operating area of the MNO network 204, a private network 208 may be established by a private network operator, such as an enterprise network operator (ENO). Private networks are operated for use by a limited group of authorized users, whereas public networks are open for use by anyone that subscribes to the service. An enterprise network is one particular type of private network. Enterprise networks are operated by an organization for use by the members of the organization. Other types of private networks may be operated by a private network manager and may be shared by more than one organization.

As shown in FIG. 2, BS/APs 103a of the MNO network may service a plurality of UEs 101 that are present within the footprint of the MNO network 204 on a first frequency f1. In addition, if the private network 208 is operated within the geographic footprint of the MNO network 204, one or more private network BS/APs 103 may provide connectivity for UEs 101 that are present within the footprint of the private network 208 on a second frequency f2.

Recently, the US Federal Government finalized rules for the use of a frequency spectrum referred to as the Citizens Broadband Radio Service (CBRS). CBRS operates in a 150 MHz wide frequency range from 3.55 GHz to 3.7 GHz. In many cases, private networks are being established in accordance with 5G specifications using CBRS bands.

In addition to MNOs and ENOs, Mobile Virtual Network Operators (MVNOs) provide a "virtual" network that uses BS/APs and the network operated by MNOs to provide a connection for an MVNO subscriber UE (hereafter, simply referred to as a "MVNO UE"). Still further, there are other services that use an MNO BS/AP, but that route packets through that MNO BS/AP to their own network Evolved Packet Core (EPC). For the purposes of this disclosure, these networks are referred to herein as "Third-Party" (TP) networks. Throughout this disclosure, communications are discussed in which "packets" are "routed", "transmitted" and "received". However, packets are merely one example of communications and embodiments are not limited to packets, as communications may take other forms as well.

Figure 3:
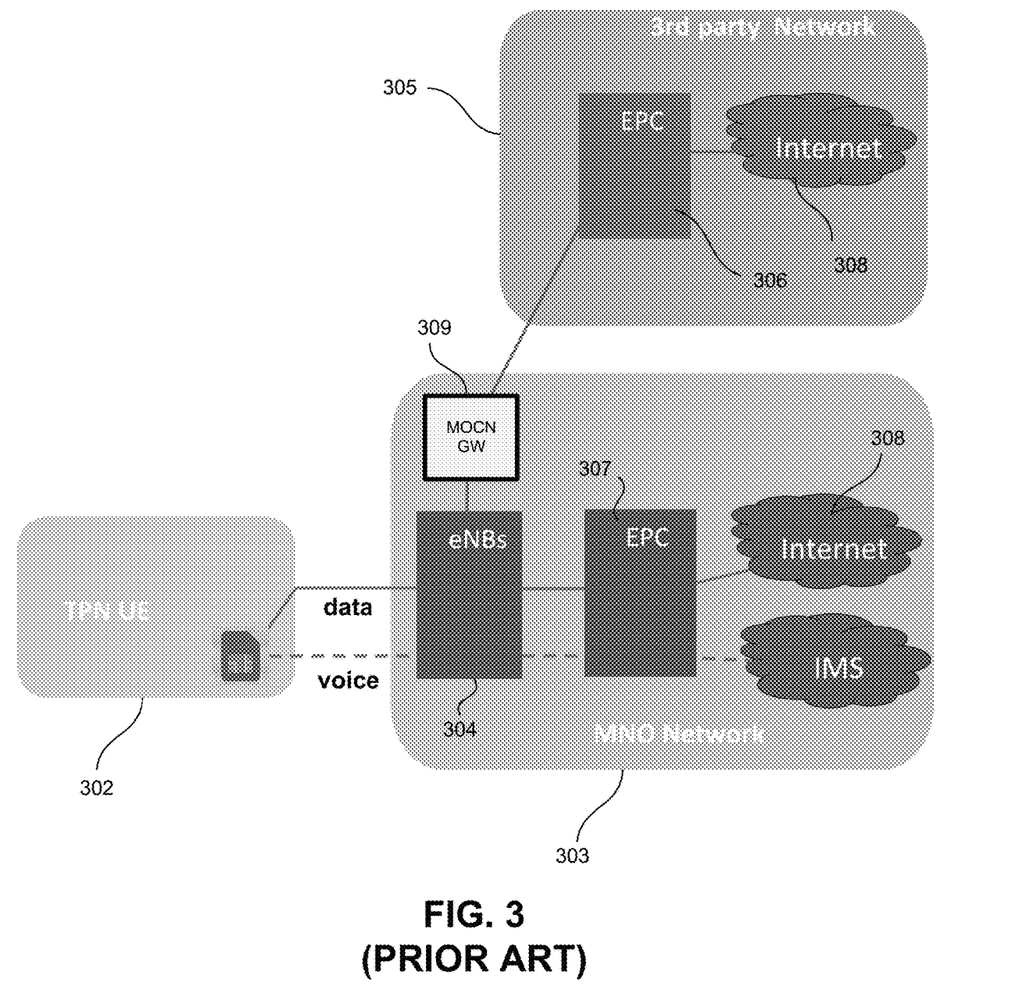
FIG. 3 is an illustration of a connection configuration in which a UE within the coverage area of an MNO network can communicate with the MNO network and a TP network through an MNO BS/AP.

FIG. 3 is an illustration of a connection configuration in which a UE 302 within the coverage area of an MNO network can communicate with the MNO network and a TP network through an MNO BS/AP (i.e., eNB). Some TP networks 305 provide a communication service that allows their subscribers to establish a communication link to the TP network's infrastructure 306 through the physical radio infrastructure of another network (e.g., the MNO 303). The architecture in which more than one core network 306, 307 can be accessed through the same BS/AP is commonly referred to as a Multi-Operator Core Network (MOCN). In some embodiments, the BS/AP is an eNB (Evolved Node B or alternatively E-UTRAN Node B) 304. In such cases, a gateway, such as a MOCN gateway 309, resides between the eNB 304 and one or more core networks, each of which can be accessed by a UE 302 through the eNB 304. The MOCN gateway directs packets that flow from the UE 302 through the eNB 304 to the appropriate core 306. A TP network subscriber UE (hereafter, simply referred to as a "TP UE") 302 within the coverage area of an MNO network 303 is connected to the MNO eNB 304. The MNO eNB 304 is part of the MNO network 303; but is connected to the TP network 305 through the MOCN gateway 309. Accordingly, the MNO eNB 304 can be used to connect the UE 302 to the TP network's EPC 306.

Figure 4:
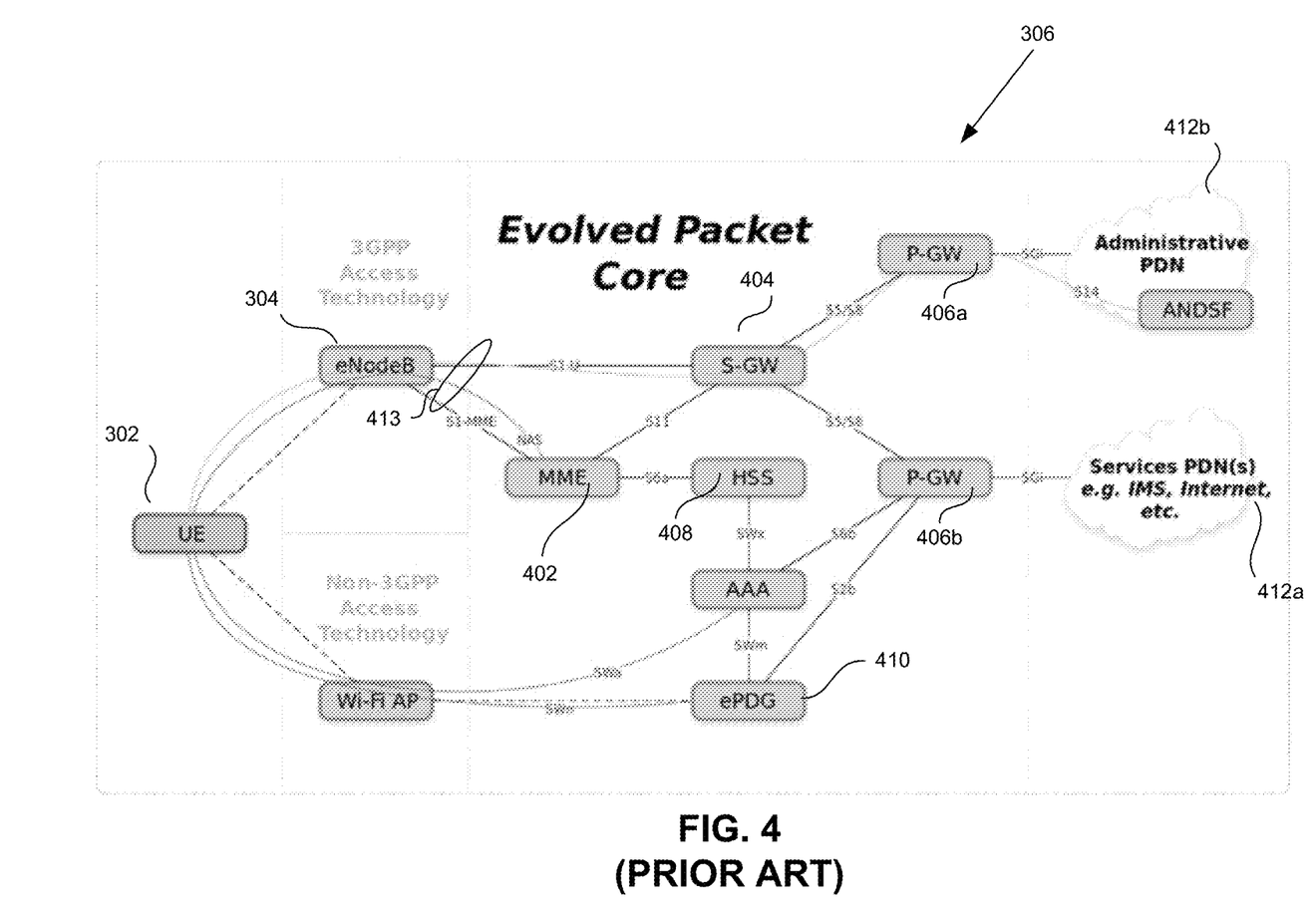
FIG. 4 is a simplified block diagram of the components of an EPC, such as the TP EPC shown in FIG. 3.

FIG. 4 is a simplified block diagram of the components of an EPC, such as the TP EPC 306 shown in FIG. 3. The TP network's EPC 306 comprises an MME (Mobility Management Entity) 402, SGW (Serving Gateway) 404, at least one PGW (Packet Gateway) 406, HSS (Home Subscriber Server) 408, ePDG (evolved Packet Data Gateway) 410, etc. The SGW routes UE 302 data packets to a Packet Data Network (PDN) 412. Accordingly, the TP EPC 306 can establish a connection to an outside PDN 412 and thus provide connectivity to the internet 308 or to other external services. That is, while the TP network 305 uses the MNO's eNB 304, the TP network 305 provides its own EPC 307 to allow the TP network 305 to control data flows through the MNO's eNB 304.

In some cases in which an TP UE 302 enters the coverage area of a private network 208, it would be advantageous for the TP UE 302 to attain access to the TP core (i.e., EPC 306) through an eNB 304 in the TP network 305. In addition, some private networks have additional features that are typically only available to UEs that are registered with the private network. Nonetheless, in some cases, the TP network 305 can contract with the private network to make such features available to TP network members without them being members of the private network. However, in cases in which the TP network 305 uses the TP EPC 306 to manage the communications through a private network eNB, there are technical challenges to providing a TP UE 302 access to such features.

Accordingly, there is a need for a method and apparatus to allow an TP UE to attain access to the TP EPC through a private network using the credentials associated with the TP network (i.e., based on a subscription with the TP network) and to also attain access to features that are provided through the private network without directly being a member of the private network. In some cases in which the TP network also has agreements with MNOs to allow the TP UE access to "bearers" that can support voice traffic, the MNO UE maintains credentials that allow it to register with the MNO and connect with an IP (Internet Protocol) Multimedia Core Network Subsystem (IMS). In such cases, it would be further desirable to allow the TP UE to gain access to such voice services while communicating through the private network BS/AP.

SUMMARY

A system and method is disclosed for allowing a Third-Party (TP) User Equipment (UE) to use a base station/access point (BS/AP), such as a 4G eNodeB (eNB) or a 5G gNodeB (gNB) of a private network, such as an enterprise network to access components of a network core, such as an Evolved Packet Core (EPC) in the TP network while also having access to features provided by or through components of an EPC within the private network.

In accordance with some embodiments of the presently disclosed method and apparatus, a UE that is not part of a private network enters the coverage area of the private network. If the UE is a subscriber to an TP network that has contracted with the private network, the UE can, upon detecting signals from a BS/AP of the private network, register with the TP core (e.g., TP EPC) through the private network BS/AP. Once the UE is in radio resource control (RRC) connected mode with the TP EPC, the UE will be connected to the TP EPC and packets will be flowing through the private network BS/AP. In this case, the EPC within the private network can detect the address of the UE. Accordingly, resources within the private network can communicate with the UE by sending packets directed to the address of the UE, having determined that address from the packets that are flowing through the BS/AP. In addition, packets that the UE sends to applications within the private network can be detected by the private network EPC and routed to those applications.

In the case in which the UE is in RRC idle mode, applications within the private network that wish to communicate with the UE must first "wake up" the UE. However, the private network does not have the ability to initiate communications with the UE, since the UE is not a member of the private network. Therefore, in accordance with some embodiments of the disclosed method and apparatus, the private network sends a message over a pseudo S5/S8 connection between the private network and the TP network requesting that the TP network contact the UE and initiate communication through the private network BS/AP. In some embodiments, the pseudo S5/S8 interface is a modified S5/S8 interface having a field that instructs a receiving EPC of the target network to move a UE from an RRC idle mode to an RRC connected mode.

In response, the TP EPC provides packets to the UE to move the UE into RRC connected mode. Once the UE is in RRC connected mode, the private network can determine the address assigned to the UE by the TP network and communicate with the UE directly through the private network BS/AP.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The disclosed method and apparatus establish a local traffic offload (LTO) function for user equipment (UE) traffic for which it is desired to have some packets flows through a private network base station/access point (BS/AP) to a Third-Party (TP) core and other packets to flow through the private network BS/AP to a core within the private network itself. For the purposes of this disclosure, an LTO function is defined as a function that allows select packets that are flowing through a connection point in a communication channel to be re-routed to a desired destination within the private network. The LTO function can be used to provide access to private network services for UEs that are communicating with a third party network or Mobile Network Operator (MNO) (collectively referred to as "non-private networks") through the private network BS/AP.

As will be discussed in further detail below, in some embodiments, a pseudo S5/S8 interface is established between LTO function and a Serving Gateway (SGW) of the TP Evolved Packet Core (EPC) to allow the LTO function to request that the SGW cause the UE to move from "radio resource control (RRC) Idle" mode to "RRC connected" mode, thus allowing the LTO function (e.g., an application running in the private network) to initiate communication with the UE.

In other embodiments, a Local Gateway (LGW) within the private network is configured to receive from a UE a request to gain access to the TP network. In response, the LGW sends instructs to both the core of the TP network and to the core of the private network. The TP network core is instructed to assign an IP (Internet Protocol) address to the UE that is within the TP network domain. Similarly, the private network is instructed to assign an IP address to the UE that is within the private network domain. The LGW receives IP address from the TP network core and the private network. The LGW maintains a Network Address Translate (NAT) table that carries each of the addresses. The core within the TP network establishes the connection with the UE using the IP address assigned to the UE by the private network. Therefore, all communications originating from the TP network core are directed to the IP address of the UE from the private network domain. The LGW in the private network uses the NAT table to translate the UE IP address from the UE address in the private network domain to the UE address in the TP network domain for such packets prior to sending those packets to the eNB for transmission to the UE. Packets that originate within the private network carry the UE IP address of the private network as well, but are not translated by the LGW.

Figure 5:
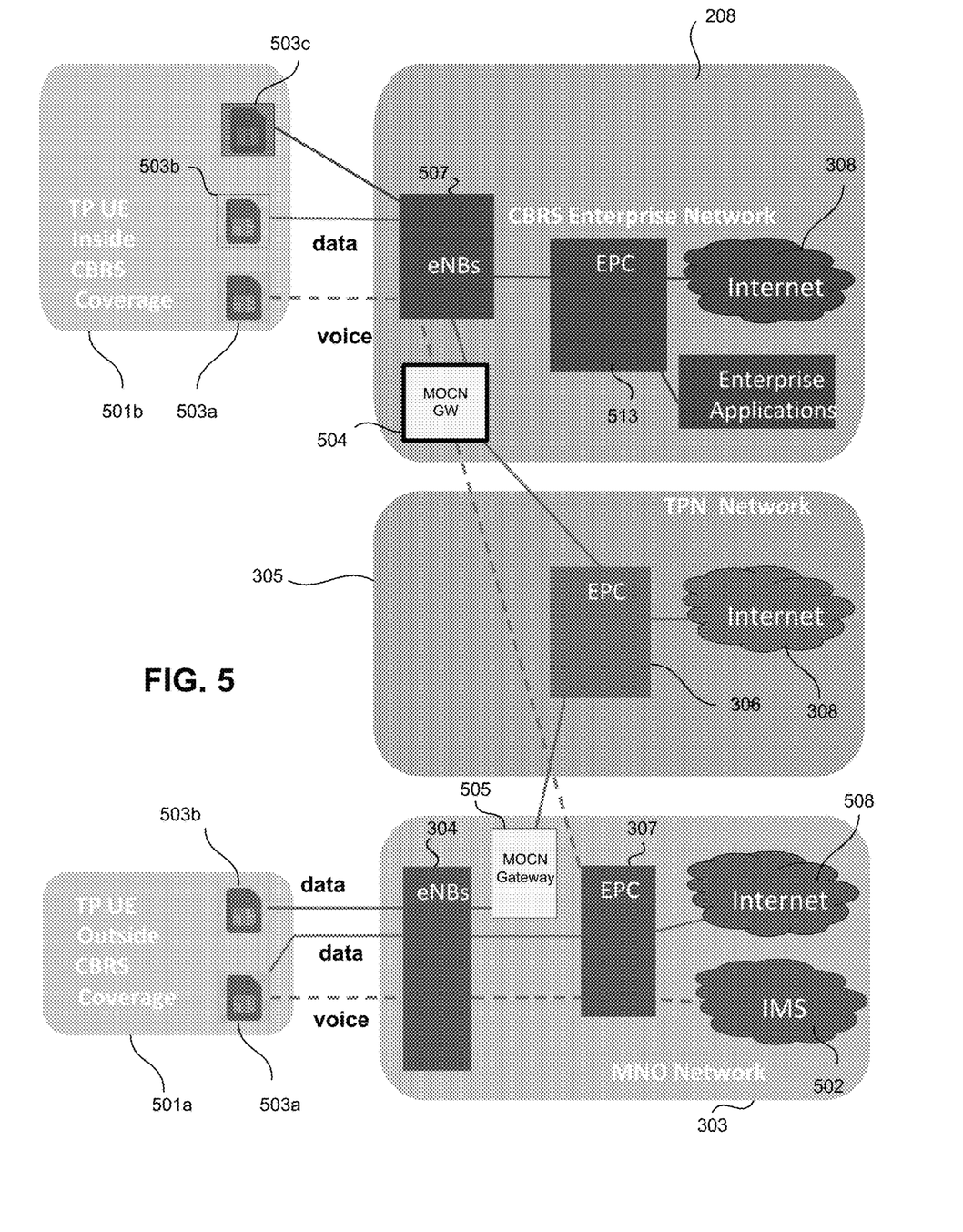
FIG. 5 is a simplified illustration of communication configurations that can be formed when a TP subscriber UE (hereafter, simply referred to as a "TP UE") is receiving services through one or more networks.

FIG. 5 is a simplified illustration of communication configurations that can be formed when a TP subscriber UE (hereafter, simply referred to as a "TP UE") 501 is receiving services through one or more networks. For example, the TP UE 501 may gain access to an IP Multimedia Core Network Subsystem (IMS) 502 through which the TP UE 501 can place voice calls. In addition, the TP UE 501 UE may gain access to various packet data networks (PDNs) (an example of which is shown to be the "Internet" 508) through which the UE 501 can access the Internet, applications supported by the enterprise network and various additional services.

A UE 501 is shown connected in two different connection configurations. In the first configuration, the UE 501a is connected through a BS/AP, such as an eNB 304 of the Mobile Network Operator (MNO) network 303, to a non-private network (e.g., either the MNO network EPC 307 or the EPC 306 of the TP network 305). The eNB 304 is configured to wirelessly receive communications from and send communications to the UE 501a. In some embodiments, the UE 501a has a first Subscriber Identification Module (SIM) card 503a that is used to provide security credentials to allow the UE 501a to access both data and voice service through the MNO network 303. When the UE 501a comes into the MNO network 303, it receives signals from the MNO eNB 304 that allow the UE 501a to identify the network 303. The UE 501a recognizes that this is a network to which it can receive service (i.e., for which it has proper security credentials) and begins a procedure to connect to the network 303. Data packets from the UE 501a are routed to the EPC 306 within the MNO network 303 based on a header in the packets that identifies the network to which the UE 501a is attempting to receive service. The MNO eNB 304 routes the data to the MNO network EPC 307 over an S1 interface (comprising an S1-User interface and S1-Control interface) 413 (see FIG. 4). Authentication is handled over the S1 link 413 between the eNB 304 and the MNO EPC 307. The UE 501a transitions to "RRC connected mode" to allow packets to be communicated between the UE 501a and the MNO EPC 307 through the MNO eNB 304.

Once connected, the UE 501a requests an IP address for the services that the UE 501a would like to access through the MNO network 303. This occurs through a domain name system (DNS) query to a DNS server (typically located in "the cloud"). Having received the IP address of the services that the UE 501a is attempting to access, data flows through the MNO eNB 304 to the Serving Gateway (SGW) 404 (see FIG. 4) which routes the data stream to an appropriate Packet Gateway (PGW) 406 and associated PDN 412 (e.g., IMS 502, Internet 508, etc.) associated with the IP address returned in response to the DNS query.

Still referring to the first connection configuration, the UE 501a has a second SIM card 503b and can also authenticate and receive service through the TP network 305. In some cases, the EPC 306 in the TP network 305 only has access to PDNs that provide data services (as opposed to an IMS that has voice capability). The UE 501a directs the request for service to the TP EPC 306 (i.e., sends packets identifying the TP network 305). A gateway, such as a Multi-Operator Core Network (MOCN) gateway 505, detects the request for services from a non-private network, such as the TP network 305 to which the MOCN gateway 505 is connected and routes the request for service from the eNB 304 to the TP EPC 306 to allow the UE 501a to register with the TP network 305. The TP EPC 306 authenticates the UE 501a in similar fashion to the authentication procedure performed by the MNO EPC 307. The UE 501a transitions to RRC connected mode and sends a DNS query similar to the DNS query sent when accessing services through the MNO network 303.

Upon receiving the DNS response with the IP address of the server that can provide the requested services, the UE 501a directs packets to that IP address and data flows through the MNO eNB 304 to the SGW 404 within the TP EPC 306, which routes the data stream to an appropriate PGW 406 and associated PDN 412.

Figure 6:
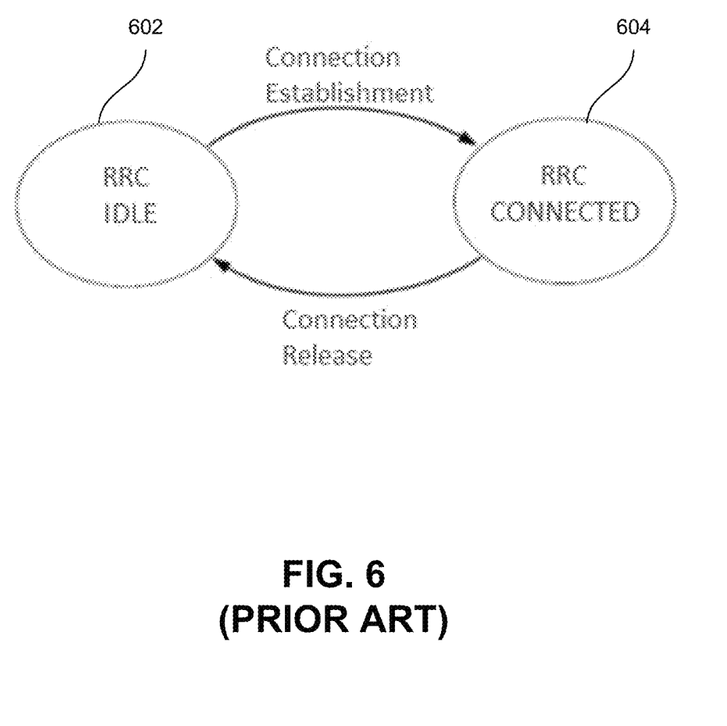
FIG. 6 is a simplified process flow diagram showing the relationship between the RRC Idle mode and the RRC connected mode.

FIG. 6 is a simplified process flow diagram showing the relationship between the RRC Idle mode 602 and the RRC connected mode 604. When a UE is attached to a network and actively communicating with the network, the UE is in RRC connected mode 604. If there is no communication for a predetermined amount of time, the connection is released and the UE enters Idle mode 602. A UE 501a may transition between RRC connected mode and RRC Idle mode without losing the connection to the network. However, the UE 501a must transition back to RRC connected mode to send or received data packets (other than those required to maintain the connection).

In the second connection configuration illustrated in FIG. 5, a UE 501b is shown connected through a BS/AP, such as an eNB 507 of a private network. The private network may be similar to the private network 208 shown in FIG. 2. The eNB 507 is configured to wirelessly received communications from and send communications to the UE 501b. In the example shown in FIG. 5, the private network 208 is a Citizen Band Radio Service (CBRS) enterprise network. The eNB 507 is connected to a MOCN gateway 504 that can provide a communication link to the EPC 307 of the MNO network 303 or the EPC 306 of the TP network 305 depending upon which of the networks the UE 501b is communicating with.

When the UE 501b enters the coverage area of the enterprise network 208, the UE 501b can establish a data link to the enterprise network EPC 513 if the UE 501b has a SIM card 503c that has the credentials indicating that it is a member of the enterprise network 208. Alternatively, the UE 501b can request service from either the TP network 305 or the MNO network 303, assuming the UE 501b has a SIM card 503a, 503b that has the necessary security credentials. In the same way the UE 501a gains access through the MNO eNB 304 to the TP EPC 306 within the TP network 305 through the MOCN gateway 505, a MOCN gateway 504 connected to the eNB 507 within the enterprise network 208 can detect a request by the UE 501b for services through either the TP network 305 or the MNO network 303 and direct packets to the appropriate network EPC.

Establishing a path through the MOCN gateway 504 allows the eNB 507 of the private network 208 to be used to provide a wireless connection between a UE 501 and either the TP network 305 or the MNO network 303. It should be noted that even if the UE 501b can attain services through the MNO network 303 and/or the TP network 305 through the private network eNB 507, unless the UE 501 is a member of the private network, services provided by the private network remain unavailable to the UE 501.

Figure 7:
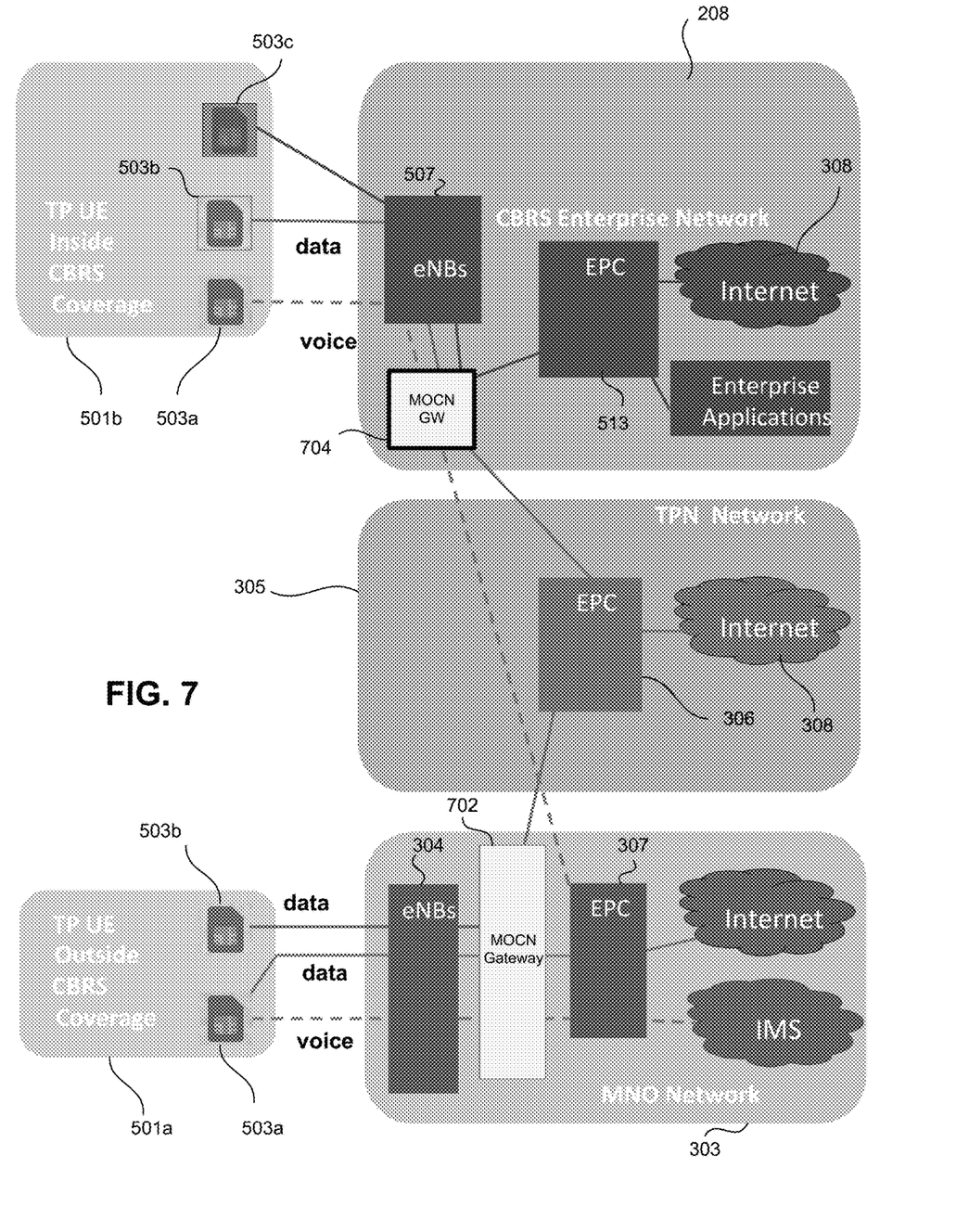
FIG. 7 is an illustration of a simplified connection configuration similar to that shown in FIG. 5*, but with a MOCN gateway placed between the eNB and the EPC.

FIG. 7 is an illustration of a simplified connection configuration similar to that shown in FIG. 5. However, the connection configuration shown in FIG. 7 shows a MOCN gateway 702 placed between the eNB 304 and the EPC 307. Accordingly, in this configuration packets that are intended for the MNO network 303 flow through the MOCN gateway 702 and are routed to the EPC 307 in the MNO network 303 by the MOCN gateway 702, similar to the packets that are intended for the other networks. Similarly, the connection between the eNB 507 of the private network and the private network EPC 513 flow through the MOCN gateway 704.

Figure 8:
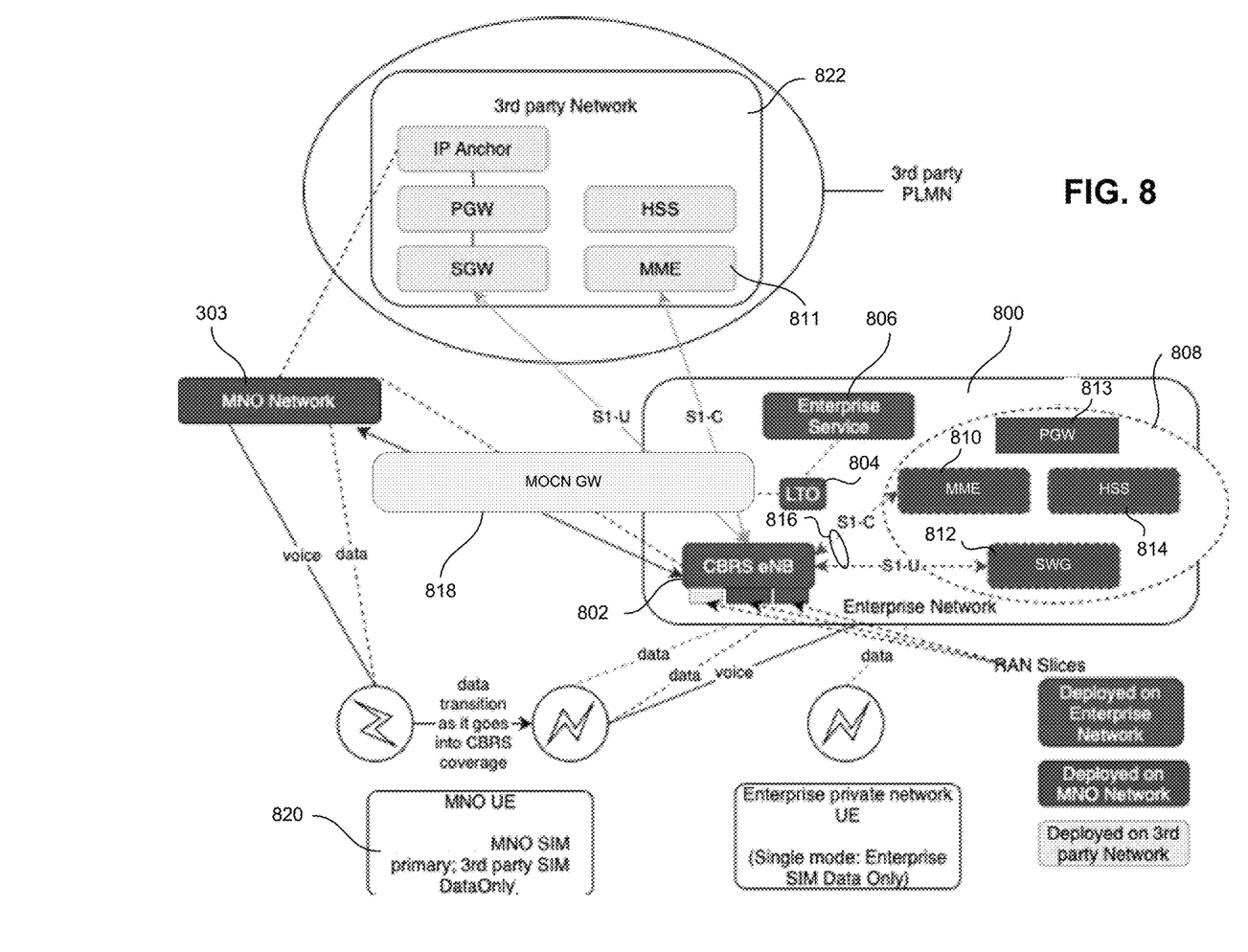
FIG. 8 illustrates connection configurations for a private network, such as an enterprise network, that allows a UE that is not a member of the enterprise network to nonetheless gain access features and services provided by the network.

FIG. 8 illustrates connection configurations for a private network, such as an enterprise network 800, that allows a UE 501 that is not a member of the enterprise network 800 to nonetheless gain access to features and services provided by the network 800 (assuming a contractual relationship allowing such access exists between the private network operator and a network to which the UE is a member). The enterprise network 800 has a BS/AP (such as an eNB 802 or a Citizens Broadband Radio Service Device (CBSD) of a CBRS), a local traffic offload (LTO) module 804, an enterprise services module 806 and an enterprise EPC 808. In some embodiments of the disclosed method and apparatus, the enterprise EPC 808 comprises the elements commonly found in an EPC, such as the elements shown in FIG. 4. However, for the sake of simplicity, only the MME (Mobility Management Entity) 810, SGW 812, Packet Gateway (PGW) 813 and Home Subscriber Server (HSS) 814 are shown in FIG. 8.

The eNB 304 is configured to wirelessly receive communications from and send communications to the UE 820. The eNB 802 is connected to the MME 810 and SGW 812 through an S1 interface 816. The S1 interface includes an S1-control (S1-C) interface and an S1-User (S1-U) interface. In addition, the enterprise network 800 may also include a MOCN gateway 818. Alternatively, the MOCN gateway 818 may be coupled to the CBRS eNB 802, but resides outside the enterprise network 800. Still further, in some embodiments, the MOCN gateway 818 is integrated into eNB 802. In any of these cases, the MOCN gateway 818 receives packets from the eNB 802, determines for which network the packet is intended and routes the packets to the intended network.

In accordance with one embodiment of the disclosed method and apparatus, when a UE 820 having an MNO SIM card and a TP SIM card (with data only capability) enters the coverage area of the enterprise network 800, the UE 820 detects the signals transmitted by the eNB 802 and identifies the eNB 802 as being in the enterprise network 800. Using the TP SIM card and associated TP security credentials, the UE 820 attempts to register with the TP network 305. The MOCN gateway 818 detects the request made by the UE 820 for services from a non-private network, such as the TP network 305 to which the MOCN gateway 505 is connected. The MOCN gateway 818 routes the request for service from the eNB 802 to the TP EPC 822 to allow the UE 820 to register with the TP network 822. Having established the connection to the TP network 305 through the enterprise eNB 802, packets flow through the MOCN gateway 818.

In one embodiment, the LTO module 804 receives packets from the MOCN gateway 818 that were communicated to the MOCN gateway 818 by the UE 820. The LTO module "sniffs" the packets to determine the IP address associated with the packets. In some embodiments, the LTO module 804 is located within the MOCN gateway 818. By sniffing the packets, the LTO module 804 can determine the IP address of the UE 820 that is sending the packets, as well as the destination to which packets originating with the UE 820 are intended to be delivered. By doing so, the LTO module 804 identifies and maintains within the LTO module 804 an IP address of the UE 820 assigned by the TP network 822. When the UE 820 recognizes that the eNB 802 is part of the enterprise network 800, the UE 820 can derive that there are certain services that are available to the UE 820 through the enterprise network 800 by virtue of its membership in either the TP network or the MNO network. Accordingly, the UE 820 can perform a DNS query to attain an IP address for particular PDNs that can provide access to the desired services.

When the DNS request is received at the LTO module 804, the LTO module 804 recognizes that the DNS request is for services associated with the enterprise network 800. Accordingly, the LTO module 804 routes the DNS query to an enterprise service module 806. The enterprise service module 806 then accesses the DNS server associated with the enterprise network services and returns an appropriate responsive IP address. The LTO module 804 responds to the DNS request by providing the responsive IP address to the UE through the eNB 802, allowing the UE 820 to access those services. When the UE 820 attempts to access those services, the LTO module 804 detects that the request for service originated with the UE 820 by the IP address assigned by the TP network 222. In addition, the LTO module 804 detects the IP address associated with the enterprise services that the UE 820 is requesting as being the responsive IP address previously provided. The LTO module 804 responds by routing the request from the UE 820 to the TP network 822, and more particularly, to the enterprise services module 806 within the TP network 822. The enterprise service module 806 in turn provides access to the requested services.

Communications, such as packets, that originate in the enterprise network 800 and that are directed by an enterprise application to the UE 820 are sent to the LTO module 804. The LTO module 804 uses that source IP address to detect communications that originate from the enterprise network 800. The LTO module 804 also maintains the IP address of the UE 820. The LTO module 804 detects that the destination IP address is the IP address of the UE 820 and forwards the packets to the UE 820 through the eNB 802.

However, if the UE 820 has entered RRC idle mode, it will not be responsive to an attempt by the enterprise network application to send packets. Therefore, the LTO module 804 detects when the UE 820 enters idle mode. Accordingly, the LTO module 804 is configured to determine that the UE 820 is registered with the TP network 822 with which the LTO module 804 can communicate over a communications interface and that the UE 820 is in idle mode. If the enterprise network sends a packet to be delivered to the UE 820, then LTO module 804 has to move the UE 820 to RRC connected mode before delivering the enterprise network packet. In accordance with one embodiment of the disclosed method and apparatus, this is done by the LTO module 804 sending a message to the TP network 305 to cause the TP network 305 to move the UE 820 from RCC idle mode to RCC connected mode. This can be done by providing a "pseudo" S5/S8 interface between the MOCN gateway 818 and the EPC 822 in the TP network 305. In some embodiments, the pseudo S5/S8 interface has limited capability and is only capable the performing simple functions necessary to cause the UE 820 to respond and move from RCC idle mode to RCC connected mode.

Alternatively, a page to the UE 820 can be broadcast out to the entire enterprise network. In some embodiments, the page can be limited to a plurality of e-NBs through which the UE 820 is communicating. When the UE 820 responds, the response will be received at eNB 802 and provided to the LTO module 804. The LTO module 804 then reconfigures the communication from the UE 820 to appear as a mobile originated message to the TP MME 811. Once the procedure is complete, the TP MME 811 communicates with the enterprise MME 810 over an S10 interface to indicate that the UE 820 has responded and is now in RCC connected mode. In other embodiments, the TP MME 811 communicates with the enterprise MME 810 over an S1-C interface through the MOCN gateway 818.

Once the UE 820 is moved back into connected mode, the LTO module 804 can again detect the IP address of the UE 820 and route packets from the enterprise application to the UE 820.

Figure 9:
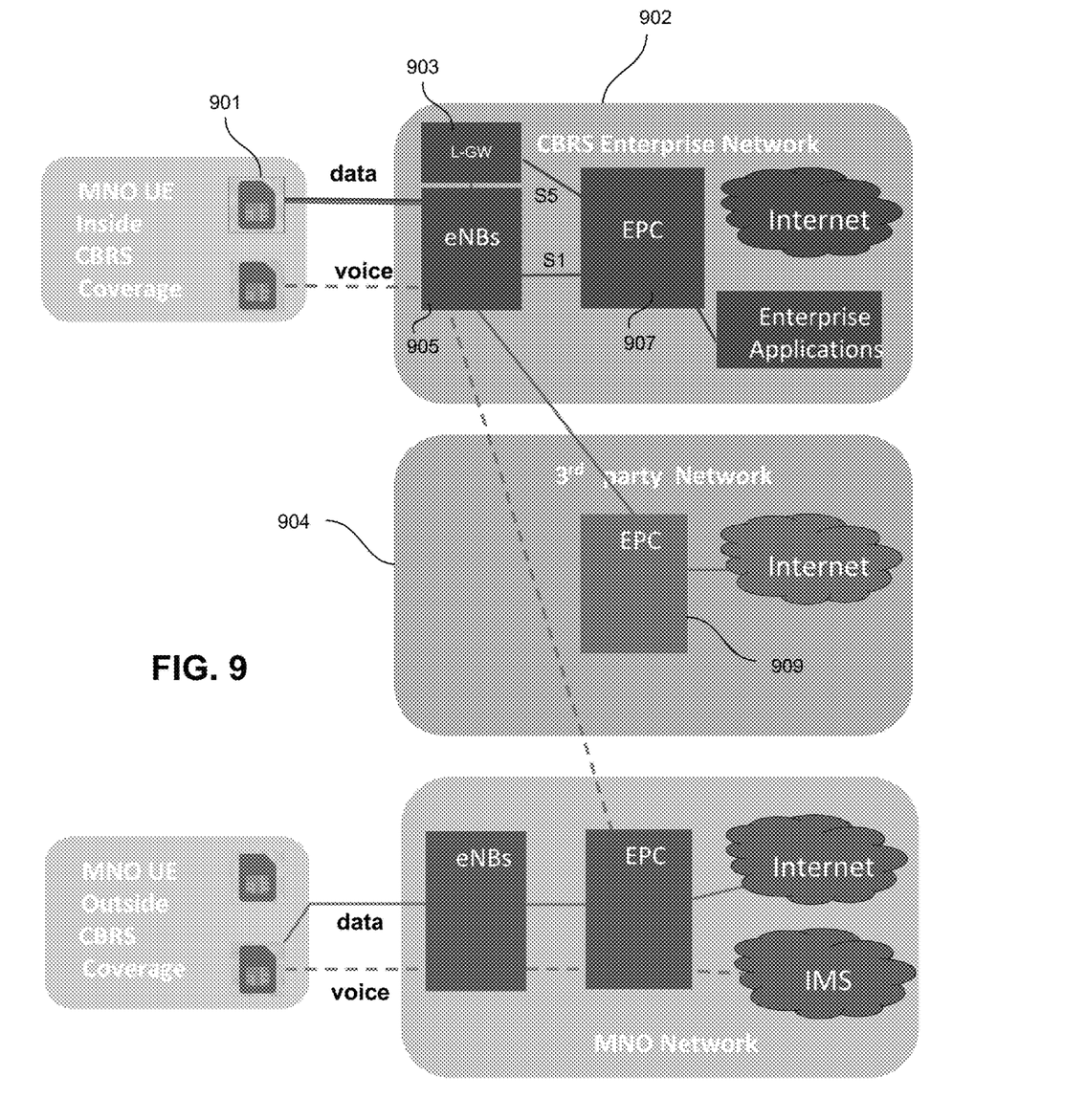
FIG. 9 is an illustration of yet another architecture in accordance with some embodiments of the disclosed method and apparatus

FIG. 9 is an illustration of yet another architecture in accordance with some embodiments of the disclosed method and apparatus. When the majority of packets that are sent from the UE 901 are likely to be intended for the enterprise network 902, an IP address is assigned from the enterprise network 902 to the UE 901. Traffic is routed to the TP network 904 only when required. Accordingly, in some embodiments of the disclosed method and apparatus, the UE 901 is associated with two IP addresses. The first IP address is from the TP network and is assigned to the UE 901 by the TP network 904. The second IP address is from the enterprise network and is assigned to the UE 901 by the enterprise network 902.

The architecture shown in FIG. 9 includes a Local Gateway (LGW) 903. In some embodiments, the LGW 903 is collocated with an enterprise network eNB 905. An LTO function is performed by the LGW 903 in this architecture.

Figure 10:
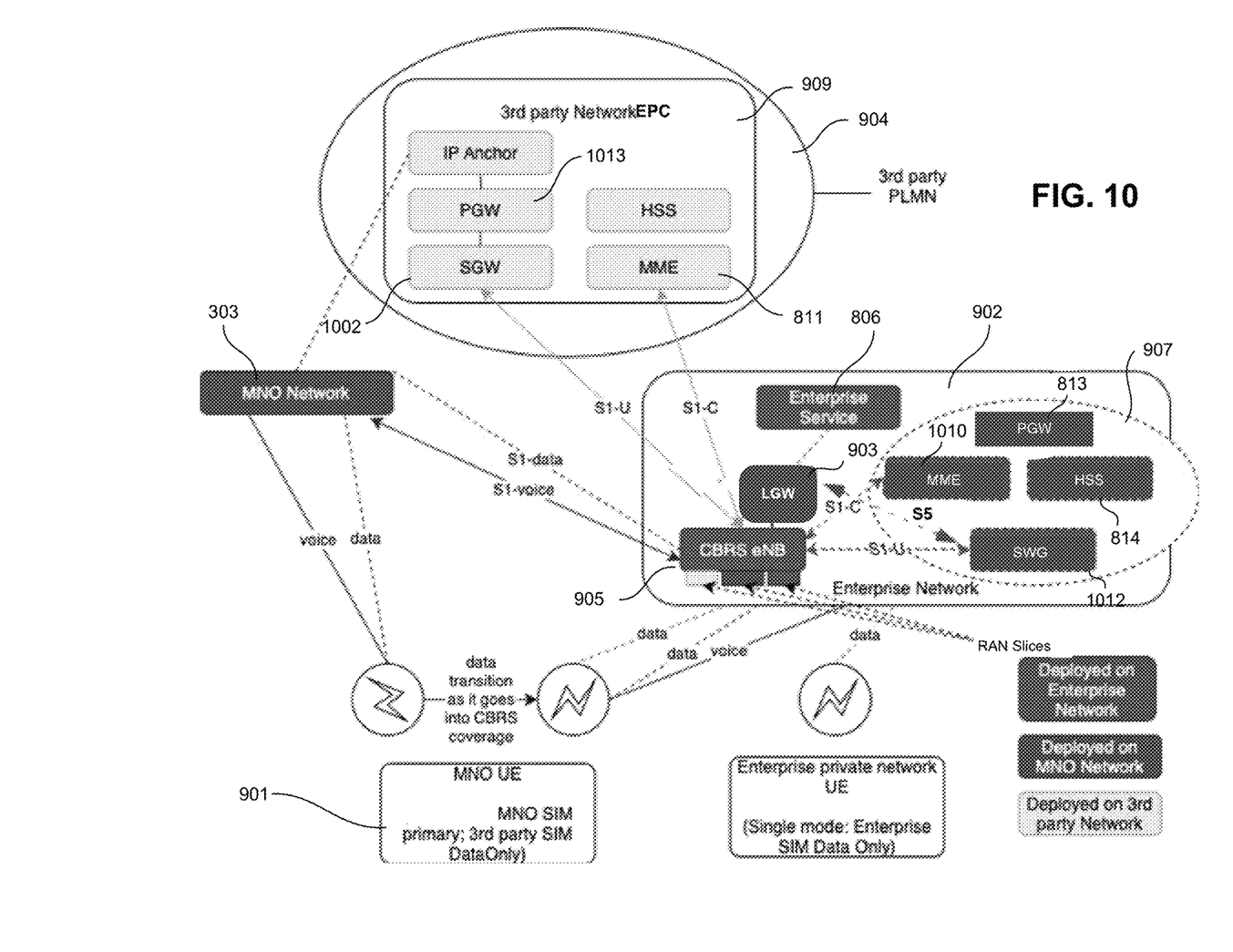
FIG. 10 is an illustration of the architecture shown in FIG. 9, showing some of the components of the EPCs.

FIG. 10 is an illustration of the architecture shown in FIG. 9 showing some of the components of the EPCs 907, 909. An S5 interface is provided between the LGW 903 and an SGW 1012 within the EPC 907. When the UE 901 initially contacts the eNB 905 to request service, the attachment of the UE 901 to the TP network 904 is accomplished through the MME 811 within the EPC 909 of the TP network 904. The LGW 903 receives from the eNB 905, the request from the UE 901 to gain access to the TP network 904. The LGW 903 routes the request for service to the MME 811 and SWG 1002 in the TP network EPC 909, as well as to the MME 1010 and SGW 1012 in the EPC 907 of the enterprise network 902.

The SGW 1012 in the EPC 907 assigns an enterprise IP address to the UE 901 (i.e., an IP address from within the enterprise network domain). The SGW 1012 provides the enterprise UE IP address to the MME 1010 in the enterprise network EPC 907. In some embodiments, the enterprise UE IP address that is assigned is provided to the TP network MME 811 by the enterprise MME 1010 over an S10 interface. In some such embodiments, the S10 interface protocol defines fields that allow the enterprise IP address to be communicated from the enterprise MME 1010 to the TP network MME 811. In other embodiments, the private network MME 1010 provides the enterprise UE IP address to the TP MME 811 over an S1-C communication protocol through the eNB 905.

When the TP network MME 811 and SGW 1002 receive the request for service from the LGW 903, a TP network UE IP address is assigned to the UE 901. However, the TP MME 811 uses the enterprise IP address to attach the UE 901 to the TP network 904. Nevertheless, the TP network IP address for the UE 901 is sent by the TP network MME 811 to the enterprise MME 1010, which sends it to the LGW 903 together with the enterprise IP address assigned by the enterprise MME 1010 for the UE 901. In some embodiments, the interface protocol provides a field to be used in communicating both the TP network UE IP address and the enterprise UE IP address to the LGW 903 from the TP network MME 811. The TP network IP address and the enterprise IP address are associated with one another and stored in a Network Address Translation (NAT) table. Since the IP address that is sent to the UE 901 in the registration process is the Enterprise network IP address for the UE 901, each communication from the UE 901 is made using the Enterprise UE IP address. The NAT table is located in the LGW 903 and is used to translate the enterprise UE IP address to the TP network UE IP address when packets are intended for the TP network. For packets with a destination within the enterprise network, the enterprise UE IP address is maintained.

Accordingly, all UE traffic directed to the Enterprise network uses the assigned IP address for interacting with enterprise services. For services that are attained through the TP network 904, the UE IP address in the packets are network address translated ("NATed") from the UE's assigned enterprise IP address to IP address provided by the TP network 904 for uplink (UL) traffic (i.e., traffic from UE to network). Similarly, for down link (DL) traffic (i.e., from network to UE) originating within the TP network which have the TP network IP address for the UE, the NAT table within the LGW is used to translate the TP network IP address into the enterprise IP address. Only traffic that needs to be exchanged between the UE and the TP network 904 needs to have a network address translation performed. The assumption with this approach is that the amount of traffic that will be directed to the TP network 904 will typically be minimal (i.e., the majority of the traffic will be retained in the enterprise network 902). In some embodiments, the NAT function is performed within the LGW 903. Furthermore, in some embodiments the LGW 903 is tightly coupled with the eNB 905. In some embodiments, the NAT table in the LGW is a configured to allow detection of internal server IP address domains versus TP server IP domains. Accordingly, determination of the destination and associated network is simplified and does not require sniffing every packet coming through to determine the route path. In some such embodiments, the packet routing can be handled in the lower layers (close to the hardware/firmware drivers) without the need for the operating system to process them on the network node (i.e., the LGW 903).

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A private network Local Traffic Off-load (LTO) system comprising:
    a) a gateway configured to:
        i. communicate with a non-private network;
        ii. communicate with a BS/AP within a private network that is in wireless communication with a user equipment (UE);
        iii. detect a request by the UE for service from the non-private network; and
        iv. route the request for service from the BS/AP to the non-private network to allow the UE to register with the non-private network; and
    b) an LTO module coupled to the gateway, the LTO module configured to;
        i. receive packets from the gateway that were communicated to the gateway by the UE;
        ii. identify and maintain within the LTO module, an internet protocol (IP) address of the UE assigned by the non-private network;
        iii. recognize a Domain Name System (DNS) query originating from the UE is a request for access to services associated with the private network;
        iv. route the DNS query to the private network;
        v. receive from the private network a responsive IP address;
        vi. respond to the UE DNS request by providing the responsive IP address to the UE through the BS/AP; and
        vii. route to the private network, requests from the UE that: (1) have the responsive IP address; and (2) were received from the UE, as determined by the IP address of the UE assigned by the non-private network.

2. The system of claim 1, wherein the LTO module is further configured to;
    a) detect communications that: (1) originate from resources within the private network; and (2) are intended for the UE; and
    b) route the detected communication to the BS/AP for transmission to the UE.

3. The system of claim 1, wherein the gateway is within the BS/AP.

4. The system of claim 1, wherein the private network is an enterprise network.

5. The system of claim 4, wherein the enterprise network is a Citizens Band Radio Service (CBRS) network.

6. The system of claim 5, wherein the BS/AP is a Citizens Band Radio Service Device (CBSD).

\* \* \* \* \*